United States Patent [19]

McIntyre

[11] Patent Number: 5,643,039

[45] Date of Patent: Jul. 1, 1997

[54] GAME CALL WITH TUNING CLIPS

[76] Inventor: David J. McIntyre, 555 Viele Rd., Red Creek, N.Y. 13143

[21] Appl. No.: 688,111

[22] Filed: Jul. 29, 1996

[51] Int. Cl.$^6$ ............................................. A63H 5/00
[52] U.S. Cl. .................................................. 446/208
[58] Field of Search ........................... 446/202, 203, 446/207–209; 84/383 R, 383 A

[56] References Cited

U.S. PATENT DOCUMENTS

| | | | |
|---|---|---|---|
| 333,094 | 12/1885 | Fuller | 446/208 |
| 813,853 | 2/1906 | Brunner | 446/208 |
| 825,610 | 7/1906 | Olt | 446/208 |
| 1,484,148 | 2/1924 | Olt | 446/208 |
| 2,544,370 | 3/1951 | Walther | 446/208 |
| 2,551,367 | 5/1951 | Fahey | 446/208 |
| 2,555,813 | 6/1951 | Priess | 446/207 |
| 2,583,400 | 1/1952 | Wade | 446/208 |
| 2,604,731 | 7/1952 | Meucci | 446/208 |
| 2,697,298 | 12/1954 | Bacon | 446/207 |
| 3,066,443 | 12/1962 | Mobley | 446/207 X |
| 3,406,479 | 10/1968 | Faulk | 446/208 |
| 4,940,451 | 7/1990 | Lady | 446/208 |
| 5,222,903 | 6/1993 | Parrott et al. | 446/207 |

*Primary Examiner*—Mickey Yu
*Attorney, Agent, or Firm*—Trapani & Molldrem

[57] ABSTRACT

A deer grunt or similar game call has a tubular mouthpiece and a sound tube. The interior of the mouthpiece contains a reed holder assembly that defines an airway between the mouthpiece and sound tube and generates sound when air passes through it. The assembly includes an elongated reed holder that extends proximally-distally in the mouthpiece and an flat reed disposed on one radial-facing surface of the reed holder. The reed is affixed to the holder at its distal end, and its proximal end is free. The grunt or game call is provided with one or more tuning clips that can be removably installed into the mouthpiece to limit the effective vibrating length of the reed and alter the sound of the call or grunt. Each tuning clip can include a U-shaped clip portion that fits snugly over the rim of the mouthpiece, a shank or shaft that extends a predetermined distance axially into the mouthpiece, and a transverse, T-shaped reed stop at the distal end. The reed stop contacts the reed at a predetermined location to define a factory-set limited vibrating length for the reed. The grunt can be used with no clip for a deep grunt sound, a long clip for a higher grunt sound, and a short clip for a bleat sound.

7 Claims, 2 Drawing Sheets

GAME CALL WITH TUNING CLIPS

BACKGROUND OF THE INVENTION

This invention relates to game calls, e.g., for use by hunters and wildlife photographers to imitate the natural voices of wildlife. The invention is more particularly concerned with a game call, such as a deer grunt, which is used with tuning clips to adjust the sound of the call to a predetermined tone or pitch.

There are many mouth operated game calls which the hunter, naturalist, nature photographer, or other user blows air through a reed device to mimic the sound of a bird or large animal. In these game calls, a reed is held on a reed holder in the instrument, and this vibrates when the hunter blows air past the reed. The tone or pitch of the game call can be adjusted by changing the length of the reed, either by changing the reed to a different length or by pressing a reed stop against the reed. Some examples include duck calls and other calls that employ a moving slide that have one end inside the instrument to abut the reed, and which can be moved slidably back and forth to change the tone of the call. These are shown generally in U.S. Pat. No. 825,610, U.S. Pat. No. 1,484,148, and U.S. Pat. No. 2,544,370.

A deer call, sometimes called a "grunt" for the deer sounds it is designed to imitate, is described in Leady U.S. Pat. No. 4,940,451. This call employs a reed situated in a mouthpiece, and the pitch or tone is varied by sliding a tuning member along a slot. A rod or finger on the tuning member contacts the reed, so that adjustment of the tuning member changes the effective vibrating length of the reed. Other deer grunts and similar calls have been proposed wherein a portion of the mouthpiece housing above the reed is soft rubber, and the hunter or naturalist can change the pitch by pressing his or her fingers against this to contact the reed.

In either case, there is considerable guesswork involved in changing the tone of the call to a proper setting. Ideally, the user should be able to transmit a sound with personality, tone variety, and precisions under a variety of field conditions, and should be able to produce the desired game sounds consistently. The tone selection should be independent of the user's finger size, whether or not he or she is wearing gloves, and without having to worry about how hard to push against the reed. However, in the case of the prior deer grunt described above, in which the user pushed down through the rubber housing of the mouthpiece, it is often difficult to find the correct tone. Pushing too hard can produce either no sound or an undesirable squawk. This can result in frightening the animals or birds away, rather than attracting them. Also, the precise locations that the user should press are often difficult to determine. Moreover, deer grunts of this type require two-hand operation, that is, one hand to manipulate the reed and the other to cup the end of the sound tube to modulate the sound. This makes it difficult for the hunter or naturalist who has only one hand available, for any of a variety of reasons.

OBJECTS AND SUMMARY OF THE INVENTION

It is an object of the present invention to provide a deer grunt or similar game call which avoids the drawbacks of the prior art, and which permits the user to adjust the pitch or tone of the call reliably and consistently.

It is another object to provide a deer grunt or call that includes means to produce a low grunt, a high grunt and a bleat sound.

It is a further object to provide a deer grunt or call that is of simple design and sturdy construction, and which is easy for the hunter or naturalist to use and understand.

It is still another object to provide a deer grunt or call which does not require finger dexterity to change the tone, but in which the tone can be adjusted quickly.

It is yet another object to provide a deer grunt or call which can be operated when the user has only one hand available, or can be operated using both hands to cup and modulate the sound.

Another advantage of the invention is that the means for adjusting or changing the pitch can also be used for removing frost from the reed during winter use.

According to an aspect of this invention, a game call is formed of an elongated sound tube having a proximal end; a tubular mouthpiece having a distal end coupled to the proximal end of the sound tube; and a reed holder assembly disposed within the mouthpiece. The reed holder assembly defines an airway from the mouthpiece into the sound tube and generates sound when air passes through it. The reed holder assembly includes an elongated reed holder that extends proximal-distally within the mouthpiece. A reed is mounted longitudinally on a radial face of the reed holder. The reed has a free proximal end and a distal end that is affixed to the reed holder. The sound generated thereby has a tone or pitch that depends on the effective vibrating length of the reed. The full length of the reed produces, e.g., a deep or low grunt sound, and a shorter effective length produces higher pitch sounds, such as a higher-pitch grunt or a bleat.

One or more tuning clips are provided which can be removably installed onto the rim of tubular mouthpiece for changing the pitch or tone. This is carried out by selectively limiting the effective vibrating length of the reed. In a preferred embodiment, the tuning clip includes a clip portion that can be pushed snugly over the rim of the mouthpiece. A shaft portion extends distally into the tubular mouthpiece a predetermined distance from the rim. A transverse reed stop or bar is disposed at a distal end of the shaft portion to define a limited vibrating length for the reed. With no clip installed, the call produces a deep grunt sound. If a long clip is used, the reed stop produces a slightly shortened effective reed length, and a higher pitched grunt sound is produced. If a shorter clip is used, the effective length of the reed is shortened considerably, and a bleat sound is produced. The deer grunt or other game call can be provided with one, two, or more than two tuning clips, depending on the variety of sounds needed. These are factory set by the length of the clip shaft portion, and will consistently produce the correct desired animal or bird sound. In a preferred arrangement, the clips are provided with round eyes, so that they can be conveniently strung on the lanyard or neck cord of the call.

While the invention is illustrated and described with reference to a deer grunt or deer call, the invention most certainly applies to other animal or game calls, such as call for moose, elk, coyote, bear, crow, rabbit, etc.

The game call can be adjusted to the desired tone while the user is wearing gloves, simply by installing the proper tuning clip. The user does not need to press or slide any members while blowing through the device. The use of a clip, rather than a manipulation of the reed or mouthpiece, means that the device can be used as easily in reverse, i.e., by sucking at the sound tube end, and still produce a proper pitch or tone. Further, the clip itself can be used to scrape ice or frost that may form on the reed, for example from breath condensation in cold weather.

The above and many other objects, features, and advantages of the invention will become apparent from the ensuing description of a preferred embodiment, which should be read in conjunction with the accompanying Drawing.

DETAILED DESCRIPTION OF THE PREFERRED EMBODIMENT

Figure 1:
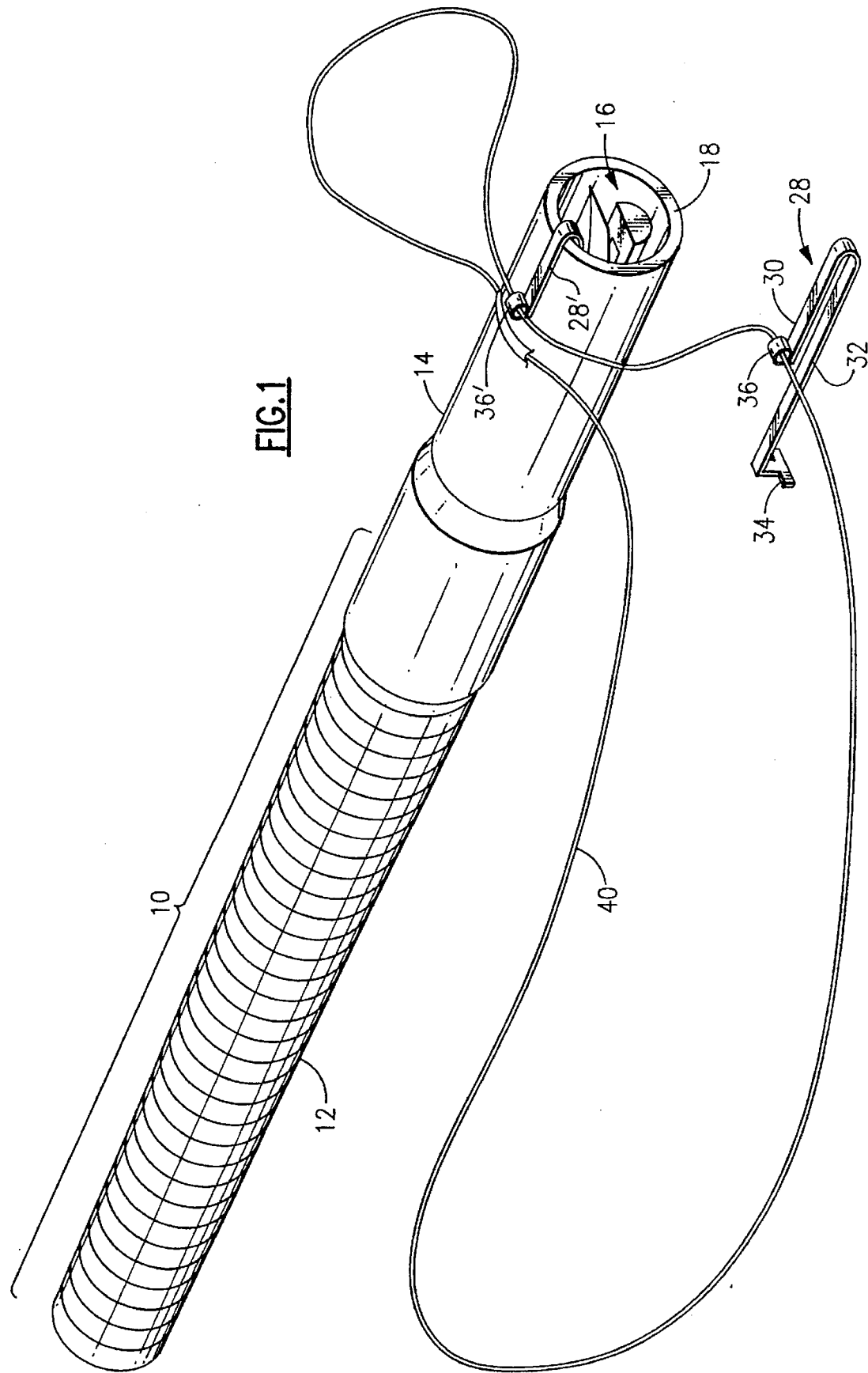
FIG. 1 is a perspective view of a deer call or "grunt" according to one embodiment of this invention.

With reference now to the Drawing, and initially to FIG. 1, a deer grunt 10 or similar game call has a sound tube 12 and a tubular mouthpiece 14 joined to it, generally in the manner illustrated. Here a distal end of the mouthpieece 14 abuts the proximal end of the sound tube 12 (also shown in FIGS. 2 and 3). The mouthpiece has a hollow interior containing a reed and holder assembly 16. The proximal end of the mouthpiece forms an annular rim or lip 18. As shown in cross section in FIGS. 2 and 3, the reed and holder assembly 16 has an elongated reed holder 20 that extends proximally-distally, and a flat reed 22 that is disposed on one radial facing side of the holder 20. The distal end of the reed 22 is affixed to the holder 20 while the other, proximal end of the reed is free. The holder 20 has a base that blocks off the air passage from the mouthpiece 14 to the sound tube 12, so that the reed and holder assembly defines the airway between the mouthpiece and sound tube.

Figure 2:
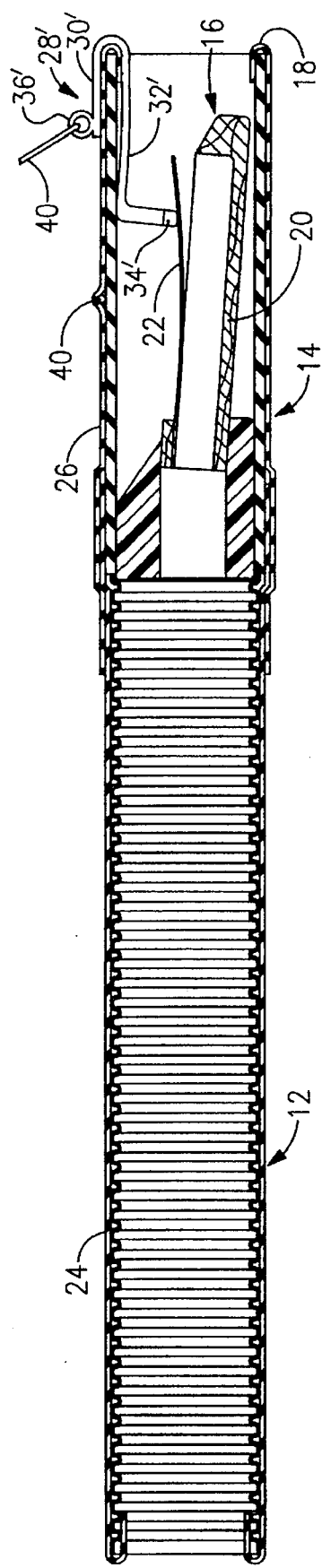
FIG. 2 is a sectional view of the grunt of FIG. 1, with one tuning clip in place.
Figure 3:
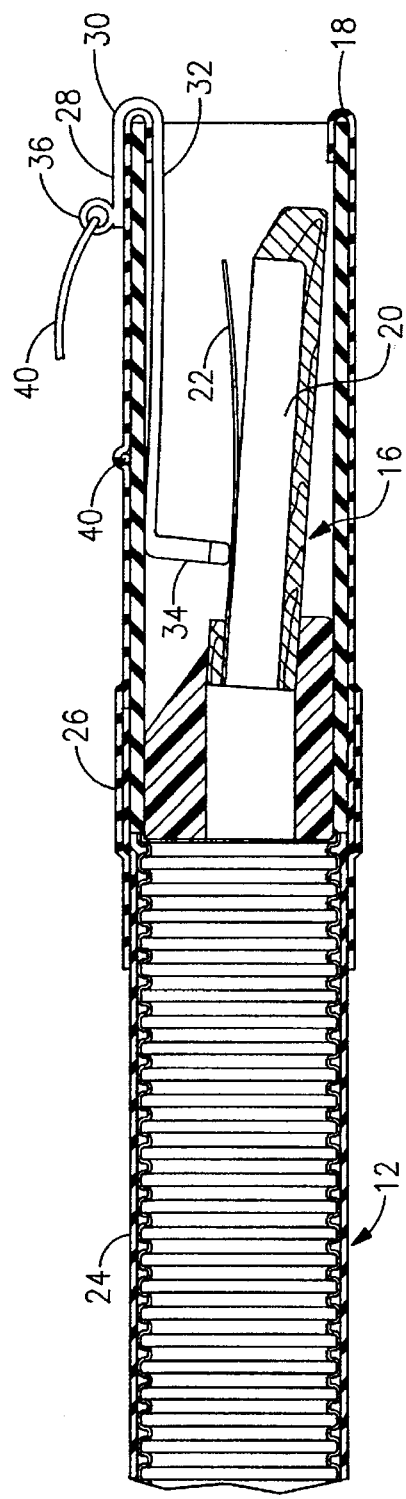
FIG. 3 is a sectional view of a proximal portion of the deer grunt of this embodiment, with another tuning clip in place.

As shown in FIGS. 2 and 3, the sound tube 12 is covered with a flexible rubber skin 24, and the mouthpiece 14 is likewise covered with a flexible rubber skin 26. In practice, the skins 24 and 26 can be a solid color, such as black or dark green, or can have a camouflage finish. Alternatively, one or both of the outer skins 24, 26 can be bright orange, for safety. A camouflage fabric sleeve (not shown) could also be employed.

Further shown in FIG. 1, and as also shown in FIGS. 2 and 3, are a long tuning clip 28 and a short tuning clip 28', each of which has a U-shaped clip portion 30 or 30', a shank or shaft portion 32 or 32', and a T-shaped transverse reed stop member 34 or 34'. One or the other of the tuning clips is installed onto the lip or rim 18 of the mouthpiece 14 to change the basic pitch or tone of the deer grunt 10, as described shortly. Each of the tuning clips also has an eyelet 36 or 36' which can be used to retain the clips on a lanyard 40 or similar string or cord, so that the clips do not become lost when not in use.

For a basic buck grunt sound, the deer grunt 10 is used without any tuning clip installed. This permits the full length of the reed 22 to vibrate when the hunter or naturalist blows through the mouthpiece. To alter the pitch, one or the other of the two tuning clips can be installed onto the rim 18 as illustrated. To achieve a slightly higher pitch grunt sound, the long tuning clip 28 is slid onto the mouthpiece as shown in FIG. 3. With this clip 28, the shaft 32 extends distally a predetermined distance from the rim 18, so that the reed stop 34 contacts the reed a short distance from the base of the reed holder 20. This limits the reed 22 to a somewhat shortened effective length, so that blowing through the mouthpiece 14 produces the desired higher pitch grunt sound. The clip 28 permits the user to produce a consistent sound, regardless of season and without having to manipulate the grunt mouthpiece in any way while blowing through it.

To produce a still higher pitch sound, e.g., the bleat sound characteristic of a doe, the short clip 28' is used, as illustrated in FIG. 2. This clip has a somewhat shorter shank or shaft 32' which extends a shorter predetermined distance distally from the rim 18. The stop 34' contacts the reed 22 closer to the proximal or free end, and limits the effective vibrating length to a shorter distance than does the long clip 28. Again, with the clip 28', the bleat sound is reliably produced under any conditions without having to manipulate the mouthpiece.

In this embodiment, the deer grunt can be used in three modes, that is, without a tuning clip to produce low tones, with the long clip 28 to produce intermediate tones, or with the short clip 28' to produce higher tones. In other embodiments, the game call could be provided with more than two tuning clips, while in still other embodiments, the call could be provided with only a single clip. Moreover, the clips can be color coded to assist the user in installing the correct tuning clip for the desired tone. That is, the two clips 28, 28' can be two different distinguishable colors, e.g., clip 28 can be blue and clip 28' can be red. In this embodiment, it is preferred that the clips be unitary and molded of a suitable semirigid plastic resin material for durability and so that the clip portions 30, 30' will fit snugly onto the rim 18, but can be easily removed when the clip 28, 28' is not needed.

As shown here, the lanyard or neck cord 40 can be threaded under the rubber skin 26 on the mouthpiece 14. Alternatively, the lanyard 40 could be attached to the sound tube 12. The lanyard 40 preferably has a breakaway feature, to prevent risk that the lanyard choke or strangle the hunter or naturalist.

Because the clips 28 and 28' make it unnecessary to manipulate the mouthpiece to affect the tone, the call or grunt 10 is reversible, that is, it can be used effectively by either blowing through the mouthpiece 14 or sucking at the sound tube 12. This gives the device better cold weather capability. Also, the tuning clip, with its T-shaped reed stop, can be used to scrape away ice or frost build-up on the reed 22, which can occur in cold weather use from breath condensation.

Because the call or grunt 10 of this invention can produce reliable and repeatable sounds under all field conditions, it is unnecessary to use any electronic sounding devices (which may be illegal, depending on local laws). Instead, the tuning clips are preset at the factory to produce all the sounds that the hunter or naturalist needs to attract the particular quarry, and without guesswork or concern about producing a wrong tone. Further, because no finger manipulation of the mouthpiece is used, no preset memory bands are needed.

While the invention has been described in detail with respect to a preferred embodiment, it should be recognized that the invention is not limited to that one precise embodiment. Rather, many modifications and variations would present themselves to persons skilled in the art without departing from the scope and spirit of the invention, as defined in the appended claims.

I claim:

1. A game call comprising:

an elongated sound tube having a proximal end;

a tubular mouthpiece having a distal end coupled to the proximal end of the sound tube;

a reed holder assembly disposed within said mouthpiece defining an airway from said mouthpiece into said sound tube and generating sound when air passes therethrough; including an elongated reed holder extending proximal-distally within said mouthpiece and a vibratory reed disposed longitudinally on a radial face of said reed holder, said reed having a free proximal end and a distal end affixed to said reed holder, wherein the sound generated thereby has a tone that depends on the effective vibrating length of said reed; and at least one tuning clip for selectively limiting the effective vibrating length of said reed, said tuning clip being removably installed onto said tubular mouthpiece such that the tuning clip can be removed or replaced without disassembly of the sound tube and the mouthpiece, and such that said reed operates at a deeper tone with the tuning clip removed and at a higher tone with the tuning clip installed.

2. A game call comprising:

an elongated sound tube having a proximal end;

a tubular mouthpiece having a distal end coupled to the proximal end of the sound tube;

a reed holder assembly disposed within said mouthpiece defining an airway from said mouthpiece into said sound tube and generating sound when air passes therethrough; including an elongated reed holder extending proximal-distally within said mouthpiece and a vibratory reed disposed longitudinally on a radial face of said reed holder, said reed having a free proximal end and a distal end affixed to said reed holder, wherein the sound generated thereby has a tone that depends on the effective vibrating length of said reed; and at least one tuning clip removably installed onto said tubular mouthpiece for selectively limiting the effective vibrating length of said reed;

wherein said at least one tuning clip includes a clip portion removably fitting onto a proximal rim of said mouthpiece, and which is installable by pushing it snugly over the rim of said mouthpiece; a shaft portion extending distally into said mouthpiece a predetermined distance from said rim; and a transverse reed stop disposed at a distal end of said shaft portion to define a limited vibrating length of said reed.

3. A game call comprising:

an elongated sound tube having a proximal end;

a tubular mouthpiece having a distal end coupled to the proximal end of the sound tube;

a reed holder assembly disposed within said mouthpiece defining an airway from said mouthpiece into said sound tube and generating sound when air passes therethrough; including an elongated reed holder extending proximal-distally within said mouthpiece and a vibratory reed disposed longitudinally on a radial face of said reed holder, said reed having a free proximal end and a distal end affixed to said reed holder, wherein the sound generated thereby has a tone that depends on the effective vibrating length of said reed; and at least one tuning clip removably installed onto said tubular mouthpiece for selectively limiting the effective vibrating length of said reed; wherein said at least one tuning clip includes a clip portion removably fitting onto a proximal rim of said mouthpiece; a shaft portion extending distally into said mouthpiece a predetermined distance from said rim; and a transverse reed stop disposed at a distal end of said shaft portion to define a limited vibrating length of said reed; and a second tuning clip having a clip portion removably fitting onto the rim of said mouthpiece; a shaft portion extending distally into said mouthpiece a predetermined distance shorter than that of the first-mentioned clip, and a transverse stop disposed at a distal end of said shaft portion.

4. A game call comprising:

an elongated sound tube having a proximal end;

a tubular mouthpiece having a distal end coupled to the proximal end of the sound tube;

a reed holder assembly disposed within said mouthpiece defining an airway from said mouthpiece into said sound tube and generating sound when air passes therethrough; including an elongated reed holder extending proximal-distally within said mouthpiece and a vibratory reed disposed longitudinally on a radial face of said reed holder, said reed having a free proximal end and a distal end affixed to said reed holder, wherein the sound generated thereby has a tone that depends on the effective vibrating length of said reed; and at least one tuning clip removably installed onto said tubular mouthpiece for selectively limiting the effective vibrating length of said reed; and wherein said at least one tuning clip includes a plurality of removably installable tuning clips, each adapted to limit the reed to a different predetermined effective vibrating length.

5. The game call according to claim 4 wherein each said tuning clip is formed unitarily of a semirigid plastic resin.

6. The game call according to claim 4 wherein said tuning clips are color coded for different respective vibrating lengths.

7. The game call according to claim 4, further comprising a cord, and wherein said tuning clips each have an eye through which the cord passes to hold the clips when not installed on the mouthpiece.

* * * * *